United States Patent [19]

Uhlmann

[11] 4,327,758
[45] May 4, 1982

[54] PAIR OF HARD MATERIAL PLAQUES FOR A HOT AND COLD WATER MIXER VALVE

[75] Inventor: Joachim Uhlmann, Leonberg, Fed. Rep. of Germany

[73] Assignee: Gevipi AG, Vaduz, Liechtenstein

[21] Appl. No.: 164,817

[22] Filed: Jun. 30, 1980

[30] Foreign Application Priority Data

Jul. 16, 1979 [IT] Italy .................. 44810 A/79

[51] Int. Cl.³ .................................. F16K 11/00
[52] U.S. Cl. ...................... 137/625.17; 137/625.41; 251/208
[58] Field of Search .......... 137/625.17, 625.4, 625.41; 251/208

[56] References Cited

U.S. PATENT DOCUMENTS 3,433,264  3/1969  Parkison .............. 137/625.17
3,661,180  5/1972  Lyon .................... 137/625.17

FOREIGN PATENT DOCUMENTS 2827236  1/1979  Fed. Rep. of Germany ... 137/625.4

Primary Examiner—Robert G. Nilson
Attorney, Agent, or Firm—Young & Thompson

[57] ABSTRACT

A pair of hard material plaques for a hot and cold water mixer valve, comprising a fixed and a movable plaques, each having two windows for passage of hot and cold water respectively, wherein the inner and outer edges of the windows are defined by circular arcs, and the edges of the windows, which cooperate with one another in the closure position, are of equal radius and are concentric in the closure position of the plaques. Due to this provision the control of admitted water quantity, by diametrical displacement of the movable plaque, and the control of mixing ratio, by rotational displacement of the movable plaque, do not interfere with one another. Preferably the remaining edges of the windows are circular arcs too, and the radial width of all windows, measured along a specific diameter, is also equal.

5 Claims, 6 Drawing Figures

PAIR OF HARD MATERIAL PLAQUES FOR A HOT AND COLD WATER MIXER VALVE

BACKGROUND OF THE INVENTION

The present invention relates to the plaques made of a hard material which are installed in mixer valves for controlling the mixing proportions and the quantity to be delivered, and more particularly to a pair of plaques of hard material for single lever mixer valves of the type in which a first plaque is intended to be installed stationary in the body of the valve and the second plaque is intended to be movably superposed on and in contact with the first plaque and to undergo an angular displacement about a fixed centre of the first plaque, for the adjustment of the mixing ratio, and a linear displacement along a diameter of the second plaque, movable with the latter and passing through the said fixed centre of the first plaque, for the adjustment of the quantity to be delivered, and in which each plaque has two arcuate passage windows, each window of each plaque is intended to cooperate with only one window of the other plaque, and the two windows of each plaque are located at opposite sides with respect to the centre of the respective plaque.

The adjustment fidelity of the valve, i.e. its aptitude not to modify the temperature of the water being delivered, i.e. the mixing ratio, as a consequence of the variation of the adjustment of the flow, and vice versa, depends substantially on the configuration of the passage windows of the plaques. Hitherto attempts have been made to improve the behaviour of the valves of the type specified hereinabove, by correcting in an empirical manner the contour and arrangement of these windows, but no really satisfactory results have been achieved.

BRIEF SUMMARY OF THE INVENTION

It is an object of the present invention to establish a rational rule for determining the contour of the passage windows formed in the plaques of the type being considered herein, so as to ensure the obtainment of the best possible fidelity of adjustment of the valve, without unfavourably affecting either the maximum flow, or the noise of the valve.

This object is attained by the fact that, according to the present invention, in a pair of plaques of the type specified in the preamble, the inner edge of the first window of the fixed plaque is substantially defined by a first circular arc having its centre located at the fixed centre of the first plaque, the outer edge of the first window of the movable plaque is substantially defined by a second circular arc whose radius is substantially equal to the radius of the said first circular arc and having its centre located at that point on the said diameter of the movable plaque which coincides with the said fixed centre of the fixed plaque in the limit interception position of the two plaques, the outer edge of the second window of the fixed plaque is defined substantially by a third circular arc having its centre located at the fixed centre of the fixed plaque, and the inner edge of the second window of the movable plaque is defined substantially by a fourth circular arc whose radius is substantially equal to the radius of the said third circular arc and having its centre located at the same point which forms the centre of the said second circular arc.

Thanks to the whole of these arrangements, in any adjustment condition of the valve, the passages for the cold and the hot water respectively, defined by the cooperation of the respective windows of the two plaques, have the configuration of arcuate slots delimited by circular arcs of equal radius and have identical width, whose value depends on the adjustment set for the flow, whilst the ratio between the lengthwise extents of the two arcuate slots depends on the adjustment set for the mixing ratio. Under these conditions, each adjustment does not influence the other adjustment, and this independence is maintained even under the conditions of maximum throttling and up to complete interception of the flow.

Preferably, in addition, the outer edge of the first window and the inner edge of the second window of the fixed plaque are defined substantially by circular arcs having their centre in the fixed centre of the fixed plaque, the radial widths of the said first and second windows of the fixed plaque are equal to one another, the inner edge of the first window and the outer edge of the second window of the movable plaque are defined substantially by circular arcs having their centre at that point on the said diameter of the movable plaque which is spaced from the centre of the said second and fourth circular arcs, in the direction towards the second window of the movable plaque, by a distance substantially equal to the radial width of the windows of the fixed plaque, and the radial widths of the said first and second windows of the movable plaque, measured along the said diameter, are equal to one another and to the radial width of the windows of the fixed plaque.

The whole of these complementary arrangements, added to the fundamental arrangements mentioned hereinabove, allows the manufacture of the plaques with windows having the minimum functionally useful extent and a harmonic configuration which may easily be obtained and is such as not to give rise to an unnecessary weakening of the plaques.

BRIEF DESCRIPTION OF THE DRAWINGS

The characteristics of the invention will be more clearly apparent from the following detailed description relating to an embodiment given by way of a non limiting example and shown in the annexed drawings, in which.

DETAILED DESCRIPTION OF THE PREFERRED EMBODIMENT

Figure 1:
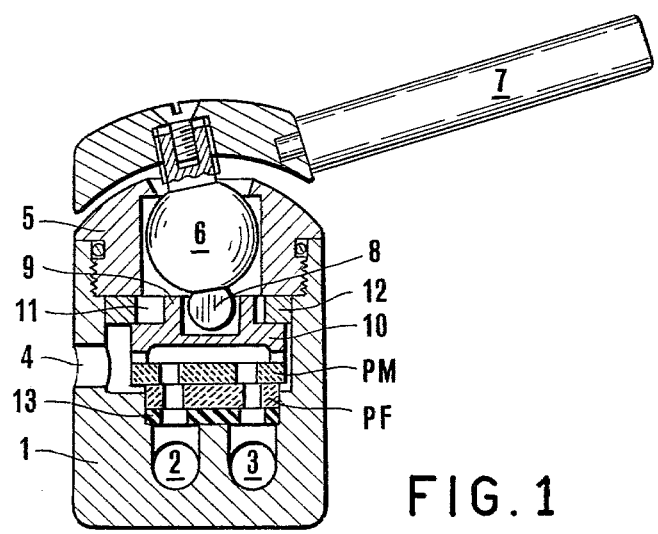
FIG. 1 is a cross-sectional view of a type of a mixer valve in which the pairs of plaques according to the present invention may be used.

In FIG. 1 there is shown a simplified cross-sectional view of a mixer valve suitable for using the pairs of plaques according to the invention. This mixer valve is shown only as an example for explaining the function of the plaques, and it is intended that the plaques according to the invention may be used in any other kind of mixer valves of the type in which plaques of a hard material are used as adjustment members for adjusting the flow and the mixing proportions.

The mixer valve shown in the drawings comprises a body 1 having located therein an inlet union 2 for the hot water, an inlet union 3 for the cold water and a delivery union 4 for the mixed water. Body 1 is closed by a cover 5 having pivoted therein a fulcrum 6 of an operating lever 7 which operates in a conventional way. Thus, connected to the fulcrum 6 is a key 8 which engages the corresponding cavity of an upper portion 9 of a control head 10. Control head 10 may slide diametrically upon vertical swinging movement of lever 7, being guided by upper portion 9 in an elongated opening 11 of a guide ring 12 which, in its turn, is rotatably mounted within the body 1, and is retained by the cover 5. As is also conventional, upper portion 9 can slide but cannot rotate in and relative to elongated opening 11, whereby rotation of control head 10 by manipulation of lever 7 also rotates ring 12.

A first fixed plaque PF made of a hard material is mounted within the body 1 in such a manner as not to be able to move, and is provided with openings which communicate with the unions 2 and 3 respectively, by the interposition of a sealing gasket 13.

A second movable plaque PM made of a hard material is coupled with the control head 10 so as to follow all its displacements and is applied against and in slidable contact with the first plaque PF. The second plaque PM also is provided with through openings which open into a cavity of the control head 10, which opens into the cavity of the body 1 and, consequently, towards the delivery union 4.

By means of the lever 7 it is possible to displace in a diametrical direction the control head 10 together with the second plaque PM whose openings, moving relative to those of the first plaque PF, allow the passage of a larger or smaller flow of water. By means of the same lever 7 it is also possible to rotate the control head 10 together with the second plaque PM whose openings, profiled as will be described later, by cooperating with the openings of the first plaque PF modify the ratio between the flows coming from the inlet unions 2 and 3 respectively.

The subject of the present invention is the pair of plaques PF and PM utilized in this or another type of single lever mixer valve.

Figure 4:
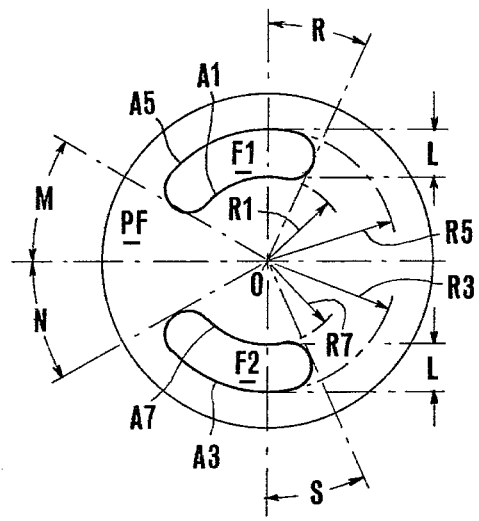
FIG. 4 is a diagrammatic representation of the first plaque and shows the linear and angular dimensions of its openings.

Referring to the fixed plaque PF shown in FIG. 4 it can be seen that in the embodiment shown the inner side A1 and the outer side A5 of the first window F1 of the fixed plaque PF are defined by circular arcs which both are centered at a point O which in this case constitutes also the geometrical centre of the plaque PF, and which, when the plaque is mounted in the valve, is intended to coincide with the trace of the axis of rotation of the control means of the valve. The said arcs have a radius R1 and R5 respectively, and therefore the constant radial width of the first window F1 is $L1 = R5 - R1$.

Similarly, the outer side A3 and the inner side A7 of the second window F2 of the fixed plaque PF are defined by circular arcs which are centered at point O and have a radius R3 and R7 respectively, so that the constant radial width of the second window F2 is $L2 = R3 - R7$.

Figure 5:
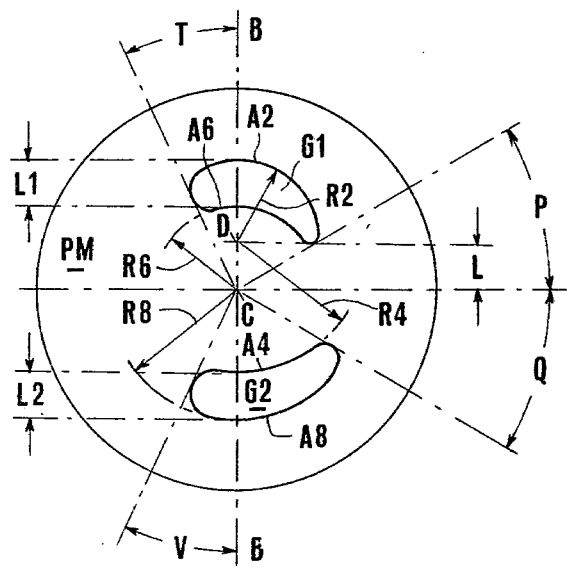
FIG. 5 is a diagrammatic representation of the second plaque and shows the linear and angular dimensions of its openings.

Referring to the movable PM shown in FIG. 5 it can be seen that, in the embodiment shown, the outer side A2 of the first window G1 and the inner side A4 of the second window G2 of the movable plaque PM are defined by circular arcs, which both are centered at a point D and have a radius R2 and R4 respectively, such as to comply with the condition required by the invention: $R1 = R2$; $R3 = R4$. Point D is located on a diameter B—B of the movable plaque PM which, when the plaque is installed in the valve, is intended to be positioned according to the direction of linear displacement of the control means of the valve, that is, parallel to elongaated opening 11, and also to pass through the fixed centre O of the fixed plaque PF with which the movable plaque PM is in contact.

In addition, in this case, the inner side A6 of the first window G1 and the outer side A8 of the second window G2 of the movable plaque PM are defined by circular arcs which both are centered at a point C which in this case constitutes also the geometrical centre of the plaque PM, and have a radius R6 and R8 respectively. Centre C, which is also located on the diameter B—B, is spaced from the centre D of the arcs A2 and A4 by a length L, and thus the widths of the windows G1 and G2, measured at the diameter B—B, are $L1 = R2 - R6 + L$ and $L2 = R8 - R4 + L$ respectively.

According to the preferred admeasurement, proposed by the invention, the following equations are obtained: $L = L1 = L2$; $R1 = R2 = R6 = R7$; $R3 = R4 = R5 = R8 = R1 + L$.

The outer and inner sides or edges of each window of each plaque are connected to each other by union sections which, in the example shown, are circular arcs of small radius, but could also have a different profile, since they do not appreciably affect the results of the utilization of the invention.

When the plaques PM and PF are superposed on one another and concentric (points C and O coincide), the widths, as defined hereinabove, of the corresponding windows correspond to one another; thus the maximum flow delivery is obtained, whilst a rotation of the movable plaque PM around its centre C gives rise to a variation of the mixing proportions, thus allowing the delivery of cold water only, hot water only, or a mixture of cold and hot water proportioned at will.

Figure 6:
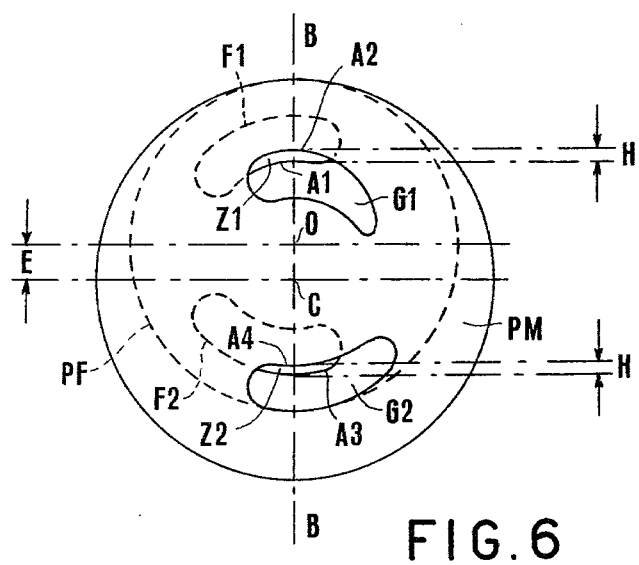
FIG. 6 is a diagrammatic representation which illustrates the cooperation of the first and second plaques superposed on one another.
Figure 2:
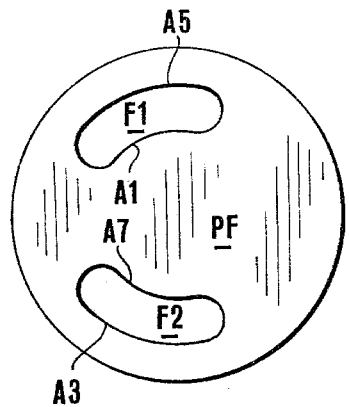
FIG. 2 is a front view of the first plaque of the pair of plaques, as seen from the side intended to contact the second plaque.
Figure 3:
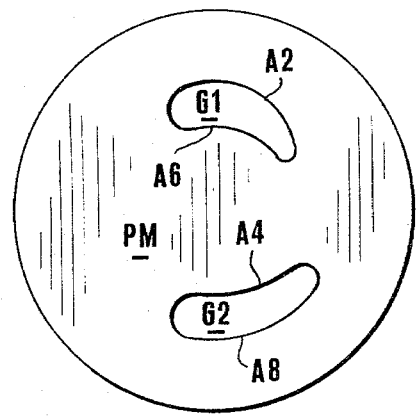
FIG. 3 is a front view of the second plaque of the pair of plaques.

On the contrary, when, by linearly displacing the movable plaque PM along its diameter B—B, an excentricity E (FIG. 6) between the centres O and C of the two plaques is obtained, the flow is throttled and a reduced flow is delivered. As can be seen from FIG. 6, under these conditions two passage slots are formed for the cold and the hot water, namely: slot Z1, limited by a portion of the arcs A1 and A2, and slot Z2, limited by a portion of the arcs A3 and A4. Owing to the conditions made by the present invention, these passage slots are limited by arcs of equal radius and have a constant width $H = L - E$ which is equal for both slots Z1 and Z2, and these conditions are maintained under any condition of adjustment, the closure taking place simultaneously for both slots and at the same time along their whole length when the linear displacement of the movable plaque PM makes its point D coincide with the centre O of the fixed plaque PF. The result is a total independence of the two adjustments, i.e., the adjustment of the delivered flow and the adjustment of the mixing ratio.

As regards the lengthwise extent of the windows F1, F2, G1, G2, it is noted that the windows F1 and F2 extend up to an angular distance M, respectively N, from a diameter of the plaque PF which does not intersect them, and up to an angular distance R, respectively S, beyond a diameter perpendicular to the first mentioned diameter, whilst the windows G1 and G2 extend up to an angular distance T, respectively V, beyond the diameter B—B of the movable plaque PM, and up to an angular distance P, respectively Q, from a diameter perpendicular to B—B. According to a preferred (however not necessary) admeasurement proposed by the invention, also the following equations are complied with: $M=P$; $N-Q$; $R=T$; $S=V$, and preferably also: $M=N=P=Q$; $R=S=T=V$, thus obtaining a configuration of appreciable symmetry, advantageous for the design and manufacture of the plaques.

In the foregoing, only the passage windows for hot and cold water have been considered; in fact, these windows are the only windows which exist if no return of mixed flow through the plaques is required, but obviously, if a return of the flow is required, the plaques will in addition have windows for the passage of the flow of mixed water, which on the other hand may be arranged in any known manner and are not affected by the utilization of the invention.

Various modifications and any substitution of technical equivalents may be made to what has been described and shown by way of example, without departing from the scope of the invention.

Having thus described by invention, what I claim is:

1. In a mixer valve comprising a body, inlet unions for hot and cold water, an outlet union for mixed water, a seat for a hard material plaque in said body, and control means intended to be operatively connected to a second hard material plaque for displacing the same rotatively around a center and linearly along a diameter of said control means in view of regulating the quantity and the mixing ratio of water passing from said inlet unions to said outlet unions, a pair of hard material plaques comprising:
a first plaque intended to be mounted stationary in said seat of the valve body, said first plaque having a center intended to coincide substantially with said center of the control means, and having a first and a second windows, intended to sealingly communicate with said inlet unions, each of said first and second windows having an inner edge, an outer edge and union sections comprising said inner and outer edges;

a second plaque intended to be superposed on and in sliding contact with said first plaque and to be operatively connected to said control means, said second plaque having a first and a second windows, intended each to cooperate with one of the windows of said first plaque, each of said first and second windows having an inner edge, an outer edge and union sections connecting said inner and outer edges;

said inner edge of the first window of said first plaque being substantially defined by a first circular arc having its center of curvature substantially located in said center of the first plaque, said outer edge of the first window of the second plaque being substantially defined by a second circular arc having a radius substantially equal to the radius of said first circular arc;

said outer edge of the second window of said first plaque being substantially defined by a third circular arc having its center of curvature substantially located in said center of the first plaque, and said inner edge of the second window of said second plaque being substantially defined by a fourth circular arc having a radius substantially equal to the radius of said third circular arc and having its center of curvature substantially coincident with the center of curvature of said second circular arc.

2. A pair of hard material plaques as set forth in claim 1, wherein said outer edge of the first window of said first plaque and said inner edge of the second window of said first plaque are substantially defined by a fifth and a seventh circular arcs having their center of curvature substantially located in said center of the first plaque; said first and second windows of the first plaque have radial widths substantially equal to one another; said inner edge of the first window of said second plaque and said outer edge of the second window of said second plaque are substantially defined by a sixth and an eighth circular arcs having their center of curvature located, with respect to the center of curvature of said second and fourth circular arcs, at a distance substantially equal to the width of said first and second windows of the first plaque, in the direction towards said second window of the second plaque; and the radial widths of said first and second windows of the second plaque, measured along a first diameter passing through the center of curvature of said second and fourth circular arcs and through the center of curvature of said sixth and eighth circular arcs, being substantially equal to one another and to said radial width of the first and second windows of said first plaque.

3. A pair of hard material plaques as set forth in claim 2, wherein said first and second windows of the first plaque extend, beyond a second diameter which passes through said center of the first plaque and intersects said first and second windows, up to a first and second angle respectively; said first and second windows of the first plaque extend, with respect to a third diameter which passes through said center of the first plaque and is perpendicular to said second diameter, from a third and a fourth angle respectively; said first and second windows of the second plaque extend, beyond said first diameter, up to a fifth and a sixth angle respectively, said first and fifth angles being substantially equal to one another and said second and sixth angles being substantially equal to one another; and said first and second windows of the second plaque extend, with respect to a fourth diameter which passes through the center of curvature of said sixth and eighth circular arcs and is perpendicular to said first diameter, up to a seventh and an eighth angles, said third and seventh angles being substantially equal to one another and said fourth and eighth angles being substantially equal to one another.

4. A pair of hard material plaques as set forth in claim 3, wherein said first, second, fifth and sixth angles are substantially equal to one another, and said third, fourth, seventh and eighth angles are substantially equal to one another.

5. A pair of hard material plaques as set forth in claim 1, wherein said union sections of said first and second windows of the first and second plaques are substantially defined by circular arcs.

* * * * *